Feb. 12, 1963  A. R. KANAGA  3,077,410
PORTION CONTROL HOLDING BAG OR CONTAINER
Filed June 8, 1959
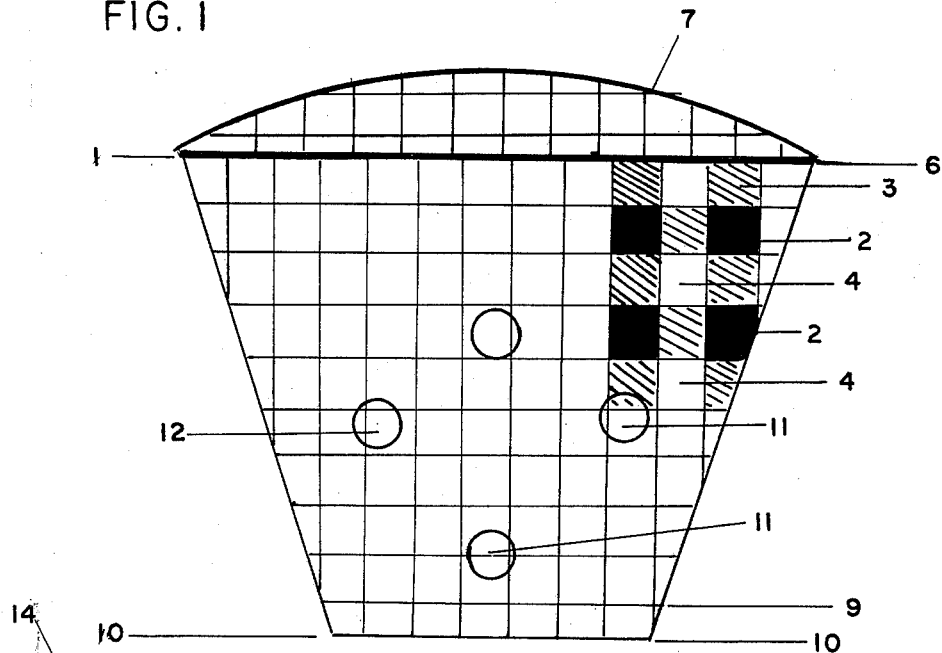
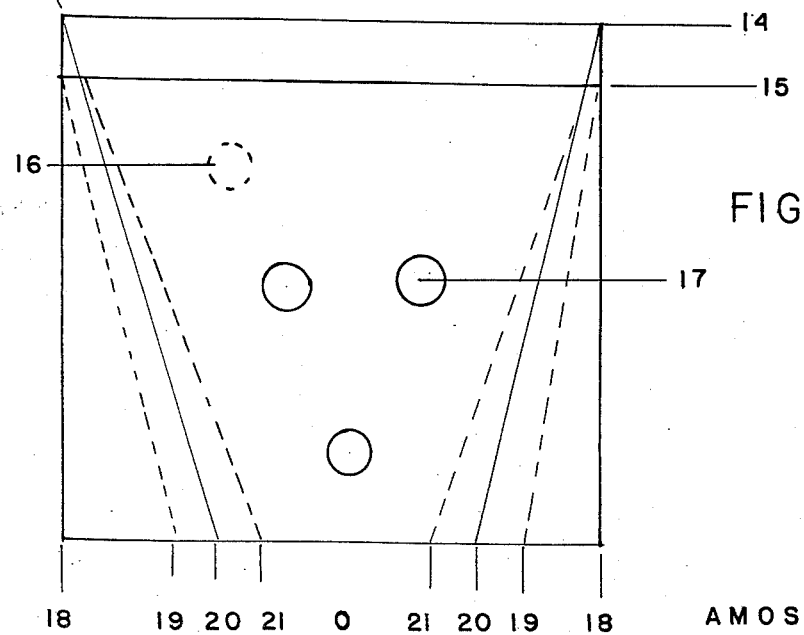
INVENTOR.
AMOS R. KANAGA
BY *Leonard A. Worthington*
*Attorney*

3,077,410
PORTION CONTROL HOLDING BAG OR CONTAINER
Amos R. Kanaga, San Mateo, Calif.
Filed June 8, 1959, Ser. No. 818,960
5 Claims. (Cl. 99—171)

This invention is an improvement over existing bags or containers which are currently being used as food dispensing containers, particularly in the serving of hot French-fried potatoes and similar products in those instances where the food product would be removed from the restaurant or food center.

The conventional bag normally used for this purpose is in general of a square or oblong shape made of dry waxed material or of a parchment type paper, treated in such manner as may be necessary to prevent the greasy contents from exuding through the exterior of the bag.

In bags now in use for such purposes, regardless of the size of the bag, it is difficult to apportion equal amounts of servings in each container. Further, the bags now in use are so designed that the product cools rapidly and presents an unattractive and unappetizing appearance.

In the majority of foods which are fried in deep fat it is necessary that the product be served and consumed as soon after serving as possible.

In establishments catering to this type of trade this presents a serious problem, particularly during periods of peak operation, and therefore it is desirable in the serving of fried potatoes, fried shrimp, prawns and fish products to have quantities of the product cooked in advance of the peak operations to enable prompt and efficient service of the same.

It is one of the purposes of my invention to allow these products to be made and packaged sufficiently prior to peak hours not only to enable quick and prompt serving of the same but also to retain the heat of the product in such manner that it will be more appetizing, more healthful and more presentable.

An additional object which my invention attains is a novel method of maintaining a prepared product in a more edible condition and to reduce sweating of the same while packaged.

A special feature and advantage of my invention is its adaptability for use in ball parks and other outdoor areas where the time and the distance between cooking and consumption are important factors.

FIG. 1 is a front elevational view of a preferred embodiment of the invention but with the metalized pattern thereof shown only in fragmentary view.

FIG. 2 is a front elevational fragmentary composite view of a conventional container and the preferred embodiment of my present invention.

I have arbitrarily selected a gingham pattern to be imprinted over the selected quality of paper for the reasons that it is easy to handle, inexpensive, attractive and the pattern favorably conforms to the heat retaining features of my present invention.

Specifically referring to FIGURE 2, the lines connecting Nos. 14 and 18 represent the outline of a standard bag. The lines connecting Nos. 19, 20 and 21 in a diagonal manner with No. 14 represent various suggested tapers or tangents.

Nos. 16 and 17 indicate breather holes punched in the bag. These breather holes have been arbitrarily fashioned in a circular design but could be star shaped, triangular, or some other appropriate design and still accomplish the intended function.

These holes are punched through both the front and back surfaces of the bag. Optional hole No. 16 is indicated by broken lines. FIGURE 1 portrays the bag in its preferred shape and design. Numbers 10—10—1—6 show the basic tangent of the bag with No. 7 indicating the lip of the bag, it being optional as to size and shape. Holes indicated by numbers 11 and 12 are for the purpose of aerating the product. No. 12 is optional. The line indicated by numbers 1–6 indicates the top surface holding capacity of the bag in relation to the bag's lip indicated by No. 7.

In describing my invention the following novel and unique features are suggested.

(1) The bag in general has a flat taper in order to allow a maximum amount of usable square inches of area. The exact size of the bag with its necessary tangents of the taper will control the quantity of the packaged product contained therein.

(2) This is a desirable feature which will result in a quantity saving especially in pre-frozen French fried potato products because of their uniformity of size and the inherent ability to remain straight rather than to curl up in different directions. The relation of the top width to the lower width is apparent from the drawings and as these are indicated merely for purposes of illustration it it obvious that these may be varied to any extent desired which would also permit the bags to be filled and stacked on a tray which is not possible in cone shaped bags. The preferred design and model is not gussetted.

The breather holes which are punched in the bag in the approximate position shown will tend to minimize interior sweating or causing the product to become soggy or mushy.

The breather holes can be varied as to position and in the case of a bag having a wider top they might be better placed in a horizontal position. The diameter of the breather holes, their style and shape are subject to variance.

The bag imprint is an important feature of this invention and may be used separately or in conjunction with the combination of other features of this bag. The metallic print may be placed on one side of the paper and the design, picture, name, trademark, printing or other features may be placed on the opposite side, or the opposite may be left plain. The heat retention features of this invention will operate satisfactorily with either method. The color of the paper may be white or any other color because this feature has no direct bearing on the basic functions for which this bag is intended.

According to normal printing custom or colored art work, the bags are imprinted before cutting and shaping. In this case the printing and special process hereinafter described would be completed on the roll prior to manufacturing in as effective and inexpensive manner as possible. Printing on regular bags is ordinarily for design purposes only. By adding a specially prepared aluminized ink or aluminum bronze powders to the ink it can be incorporated with the other colors and present a more attractive appearance.

FIGURE 1 illustrates in numbers 1—2—3 and 4 the manner in which the overlapping of these inks will produce a more effective heat retaining device. My invention is superior to a solid aluminum bag which only permits partial insulation. Since it is disadvantageous to use a full foil covering for this invention the area designated by the No. 2 would be a double imprint at each intersection which would make the square double the density of those squares designated as No. 3. Squares designated as No. 4 would have no imprinting whatsoever. This result produces a partially aluminized bag with greater heat retaining qualities with a greater commercial value than the average parchment or dry wax type bag. The cost of the bag covered by this invention is but a fraction of that of a fully aluminized bag.

An advantage of my invention over aluminum bags is that the latter causes the product to sweat due to the lack of proper circulation and heat dissipation. A further advantage in the use of aluminum bronze powders as the printing base either in natural silver color or by addition of a printing tint to the color is that it adds to the gingham pattern or similar design the proper amount of insulation necessary to minimize sweating and to maintain the product at maximum temperatures. The metallic substance has the capacity to attract and retain the desired heat as well as reflecting the radiated heat given off by the product. When placed in food warmer units the bag is exteriorly heated as well which assists in maintaining the proper temperature.

FIGURE 1 shows that the checkered pattern allows a heavy durable overprint at No. 2, a single print at No. 3 and no print whatsoever at No. 4. This produces an optimum of efficiency in heat regulation as compared to the extremes afforded by regular paper bags which dissipate the heat and the solid aluminum foil bags which cause over-swelling. All of the squares in the gingham design should be as close to the density ratio 2–1– and 0 as possible.

In FIGURE 1 the lip indicated by No. 7 may be increased in size to allow the overlap to completely cover the product. In such a case perforated holes similar to numbers 11 and 12 would be punched in the lip of the bag. These holes would be ineffective although harmless if the bag were not closed but if the lip were used to close the bag their use would produce better results.

The reduced cost of manuacturing the bag covered by this invention permits a lower selling price of the product while the heat control features and preservation of quality of the product are advantageous features not found in any other container.

Since bags normally used for the intended purposes are given away, the cost of manufacturing becomes an important factor.

While this invention is essentially a portion controlled bag with heat retaining and regulating advantages it is not limited to these features. The bag as described and as drawn may likewise be used in other shapes, sizes and designs, for use with hot dogs, hamburgers and other products where the portion control is regulated by the product itself. In such cases the composition of the bag and its breather holes rather than its shape would be the essential factors.

Regardless of the manner in which I have described my invention I claim the following improvements:

1. In combination, a plurality of units of prepared hot food constituting a predetermined portion, and a sheet folded upon itself and sealed at the opposed edges to define a receptacle of predetermined capacity and of two sides holding said predetermined portion of said plurality of units of prepared hot food, the defined receptacle having at least one vent therein and having a relatively wide mouth for the introduction and removal of said units of prepared hot food, and an overlying metal pattern on the exterior surface of at least one side of said defined receptacle; said metal pattern defining plain areas of said sheet in alternation in both directions with areas of metal and serving to minimize sweating of said predetermined portion of said prepared hot food and to inhibit premature disintegration thereof.

2. In combination, a predetermined portion of prepared hot food, and a sheet folded upon itself and sealed at the opposed edges to define a receptacle of predetermined capacity and of two sides holding said predetermined portion of prepared hot food, and insulation metal imprinted onto the exterior surface of at least one side of said defined receptacle and arranged in a pattern; said pattern consisting of a plurality of rows and columns of metal leaving plain areas of said sheet therebetween and serving to minimize sweating of said predetermined portion of prepared hot food and to retain the heat of the food for an appreciable period of time without disintegration thereof.

3. In a food portion control device for regulating the quantity of units of a prepared hot food product that may be held therein in a palatable condition; said device consisting of a receptacle of a predetermined capacity and having a plurality of unaligned vents in opposite sides thereof and also having a relatively wide mouth for the introduction and removal of said hot food product, and a metal insulating coating imprinted onto the exterior surface of at least one side of said receptacle; said metal insulation coating being arranged in a pattern of rows and columns leaving uncoated areas therebetween.

4. A portion control holding bag consisting of a folded sheet of paper stock fastened together at the folds to define an interior compartment of predetermined capacity for receiving and holding a predetermined portion of a hot prepared food, and heat insulation coating strips imprinted onto the exterior surface of said sheet in intersecting rows and columns in variably spaced relationship to one another defining a variable check insulation pattern on the exterior surface of the said compartment serving to minimize sweating of the hot food and to inhibit deterioration and loss of palatability of the prepared hot food placed therein.

5. A portion control holding bag as defined in claim 4 wherein said sheet is formed with a plurality of holes at random locations therein whereby the defined compartment has a plurality of unaligned vents therein for permitting the breathing of the hot food placed therein.

References Cited in the file of this patent

UNITED STATES PATENTS

| | | |
|---|---|---|
| 1,297,994 | Boyer | Mar. 25, 1919 |
| 2,162,258 | Hultin | June 13, 1939 |
| 2,262,111 | Moore | Nov. 11, 1941 |
| 2,452,174 | Arnold | Oct. 26, 1948 |
| 2,585,214 | Belmont | Feb. 12, 1952 |
| 2,664,358 | Eichler | Dec. 29, 1953 |
| 2,684,807 | Gerrish | July 27, 1954 |
| 2,688,914 | Eckler | Sept. 14, 1954 |
| 2,756,154 | Mahaffy | July 24, 1956 |
| 2,759,830 | Touceda | Aug. 21, 1956 |

FOREIGN PATENTS

| | | |
|---|---|---|
| 113,542 | Australia | July 21, 1941 |